United States Patent
Berlanger et al.

(10) Patent No.: US 8,732,949 B2
(45) Date of Patent: *May 27, 2014

(54) PROCESS FOR MANUFACTURING A SINGLE-PIECE BLISK BY CUTTING WITH AN ABRASIVE WATER JET

(75) Inventors: Serge Berlanger, Leuville sur Orge (FR); Sebastien Bordu, Brie Comte Robert (FR); Thierry Jean Maleville, Milly la Foret (FR); Christophe Charles Maurice Roca, Soisy sur Seine (FR)

(73) Assignee: SNECMA, Paris (FR)

( * ) Notice: Subject to any disclaimer, the term of this patent is extended or adjusted under 35 U.S.C. 154(b) by 644 days.

This patent is subject to a terminal disclaimer.

(21) Appl. No.: 12/933,951

(22) PCT Filed: Mar. 25, 2009

(86) PCT No.: PCT/EP2009/053485
§ 371 (c)(1),
(2), (4) Date: Sep. 22, 2010

(87) PCT Pub. No.: WO2009/121767
PCT Pub. Date: Oct. 8, 2009

(65) Prior Publication Data
US 2011/0016715 A1 Jan. 27, 2011

(30) Foreign Application Priority Data
Mar. 31, 2008 (FR) .................................. 08 52076

(51) Int. Cl.
*B23P 15/02* (2006.01)
*B24C 1/00* (2006.01)

(52) U.S. Cl.
USPC .......................................... 29/889.7; 451/36

(58) Field of Classification Search
USPC .................................. 29/889.7; 451/38, 40, 99
See application file for complete search history.

(56) References Cited

U.S. PATENT DOCUMENTS

| | | | |
|---|---|---|---|
| 6,077,002 A * | 6/2000 | Lowe | 409/132 |
| 6,276,899 B1 | 8/2001 | Lambert et al. | |
| 7,934,975 B2 * | 5/2011 | Thompson | 451/5 |
| 7,967,659 B2 * | 6/2011 | Erickson et al. | 451/5 |
| 2003/0039547 A1 | 2/2003 | Bourgy et al. | |
| 2005/0025598 A1 | 2/2005 | Nowak et al. | |
| 2009/0325468 A1 * | 12/2009 | El-Wardany et al. | 451/38 |
| 2010/0074704 A1 * | 3/2010 | Rozic et al. | 409/141 |

(Continued)

FOREIGN PATENT DOCUMENTS

| | | |
|---|---|---|
| EP | 1 285 714 | 2/2003 |
| EP | 1 502 682 | 2/2005 |
| FR | 2 699 850 | 7/1994 |

OTHER PUBLICATIONS

Zhao Wan-sheng, et al., "Machining Technology Used in Turbine Blisk", Aviation Precision Manufacturing Technology, vol. 36 No. 5, Oct. 2000, pp. 1-5 (with English Abstract).

Harris, I.D.: "Abrasive water jet cutting and its applications at TWI (UK)", Welding in the World/Le Soudage Dans Le Monde, vol. 33, No. 4, pp. 277-286, XP000454830, ISSN: 0043-2288, (2004).

(Continued)

*Primary Examiner* — Alexander P Taousakis
(74) *Attorney, Agent, or Firm* — Oblon, Spivak, McClelland, Maier & Neustadt, L.L.P.

(57) ABSTRACT

A process for manufacturing a single-piece blisk, including: using an abrasive water jet to cut a block of material, so as to create blade preforms extending radially from a disk, then milling the blade preforms.

16 Claims, 3 Drawing Sheets

(56) References Cited

U.S. PATENT DOCUMENTS

| | | |
|---|---|---|
| 2010/0307442 A1* | 12/2010 | Bolender et al. ......... 123/184.56 |
| 2011/0016712 A1* | 1/2011 | Berlanger et al. ........... 29/889.7 |
| 2011/0016714 A1* | 1/2011 | Berlanger et al. ......... 29/889.23 |
| 2011/0016716 A1* | 1/2011 | Berlanger et al. ......... 29/889.23 |
| 2011/0023300 A1* | 2/2011 | Berlanger et al. ......... 29/889.23 |
| 2011/0041334 A1* | 2/2011 | Berlanger et al. ......... 29/889.23 |

OTHER PUBLICATIONS

U.S. Appl. No. 12/921,493, filed Sep. 8, 2010, Berlanger, et al.
U.S. Appl. No. 12/933,955, filed Sep. 22, 2010, Berlanger, et al.
U.S. Appl. No. 12/933,978, filed Sep. 22, 2010, Berlanger, et al.
U.S. Appl. No. 12/933,953, filed Sep. 22, 2010, Berlanger, et al.
U.S. Appl. No. 12/933,884, filed Sep. 22, 2010, Berlanger, et al.

* cited by examiner

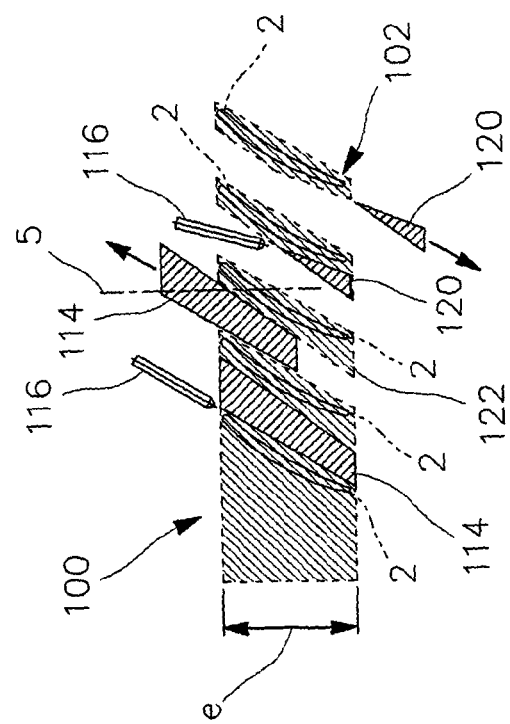
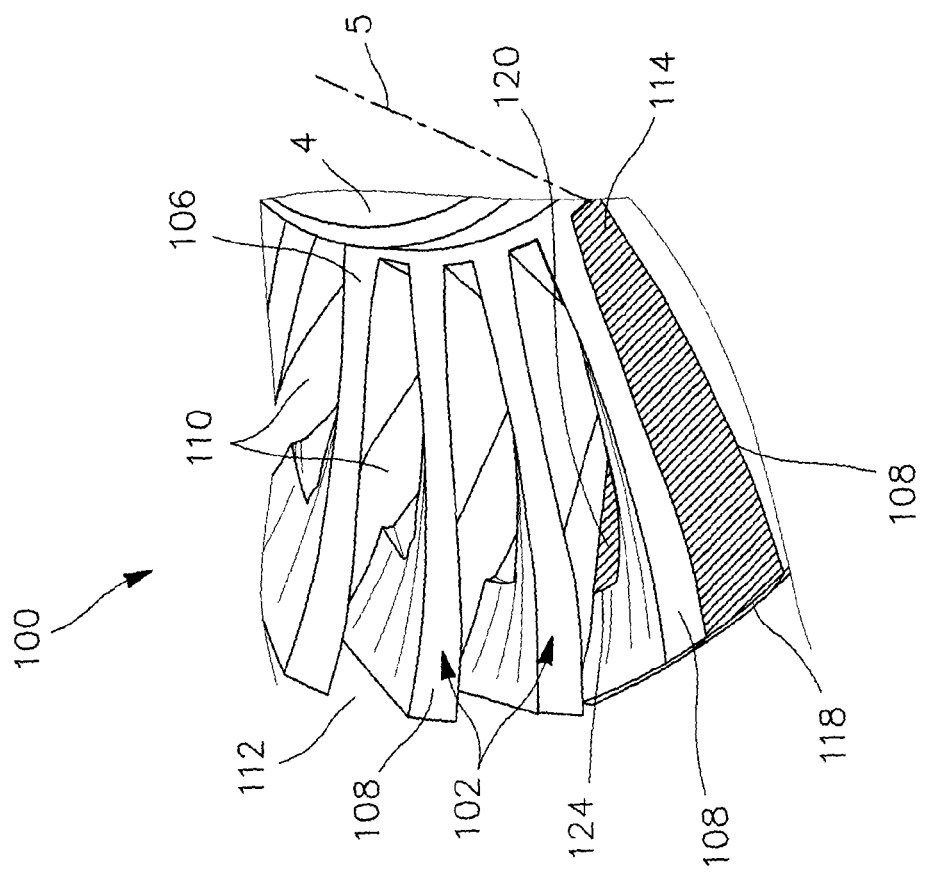
FIG. 2a
FIG. 2b

PROCESS FOR MANUFACTURING A SINGLE-PIECE BLISK BY CUTTING WITH AN ABRASIVE WATER JET

TECHNICAL DOMAIN

This invention relates in general to the manufacturing of single-piece bladed disks, preferably for an aircraft turbine engine.

STATE OF PRIOR ART

A single-piece bladed disk, also called a blisk, is usually made by milling a block of material, usually made of titanium.

Nevertheless, this process, although it is well controlled, cannot be considered to be fully optimised in that manufacturing times are very long, largely due to the large amount of material to be removed, namely up to 75% or even more by weight of the initial block of material.

Production costs may also be penalised by this long manufacturing time, which firstly involves the prolonged presence of operators at milling machines, and secondly causes fast wear of tools and particularly relatively expensive heads of milling machines.

SUMMARY OF THE INVENTION

Therefore, the purpose of the invention is to at least partly remedy the above-mentioned disadvantages of embodiments according to prior art.

To achieve this, this invention relates to a process for manufacturing a single-piece blisk, comprising:
- a step in which an abrasive water jet is used to cut a block of material, so as to create blade preforms extending radially outwards from a disk; then
- a step to mill blade preforms.

Thus, the principle of the invention is based on the use of a preliminary step to cut a material block using an abrasive water jet, before one or several milling steps are carried out on the block.

This considerably reduces manufacturing times and costs in comparison with a process based solely on milling a solid block, considering that the abrasive water jet cutting technique is capable of removing large quantities of material in a relatively short time. For example, the time required to obtain a blisk that would have required 310 hours of machining using a prior technique will be reduced to only about 140 hours, plus a very small number of hours of cutting with the abrasive water jet.

The reduction in milling time means that the work to be done by operators working on milling machines is significantly reduced, such that they can handle several milling machines and/or also control the tooling used for cutting with the abrasive water jet.

Finally, the reduction in the milling time also advantageously significantly reduces tooling wear, particularly wear of milling machine heads, which even further reduces production costs.

Therefore, use of the process is particularly suitable for cases in which 75% or even more of the material in the original block is removed, because much of this removal can be done quickly by cutting with the abrasive water jet. It is preferably arranged such that said abrasive water jet cutting step consists of removing at least 50% by weight of said block of material. In other words, the ratio between the weight of the block at the time of the abrasive water jet cutting step and the weight of the same block at the end of this step in which the blade preforms appear, is preferably more than 2.

Note in this respect that the abrasive water jet cutting step is followed by a step to mill blade preforms, the milling step preferably being done so as to obtain profiled blade blanks, this step preferably being followed by a milling step to finish blade blanks so as to obtain blades to the final profile.

Preferably, the diameter of said single-piece blisk is greater than or equal to 800 mm. Preferably, the minimum length of the blades is 150 mm.

Preferably, the thickness of said single-piece blisk is greater than or equal to 100 mm. Nevertheless, it may be of the order of 160 mm or even more due to the potentially high performances that can be achieved by the abrasive water jet cutting technique. This thickness is approximately equal to the distance along the blisk axis covered by each blade, between the leading edge and the trailing edge.

Preferably, the blades of the single-piece blisk are twisted, the angle of twist varying up to 45° or even more.

Preferably, said material block used is made of titanium or a titanium alloy.

Preferably, said single-piece blisk is a single-piece blisk for an aircraft turbine engine.

Even more preferably, said single-piece blisk is a single-piece blisk for a turbine or compressor rotor in an aircraft turbine engine.

Other advantages and characteristics of the invention will become clear after reading the following detailed and non-limitative description.

BRIEF DESCRIPTION OF THE DRAWINGS

This description will be made with reference to the appended drawings among which;

FIGS. 2a to 2d represent views diagrammatically showing the single-piece blisk at different steps in its manufacturing process in the form of a preferred embodiment.

DETAILED DESCRIPTION OF PREFERRED EMBODIMENTS

Figure 1:
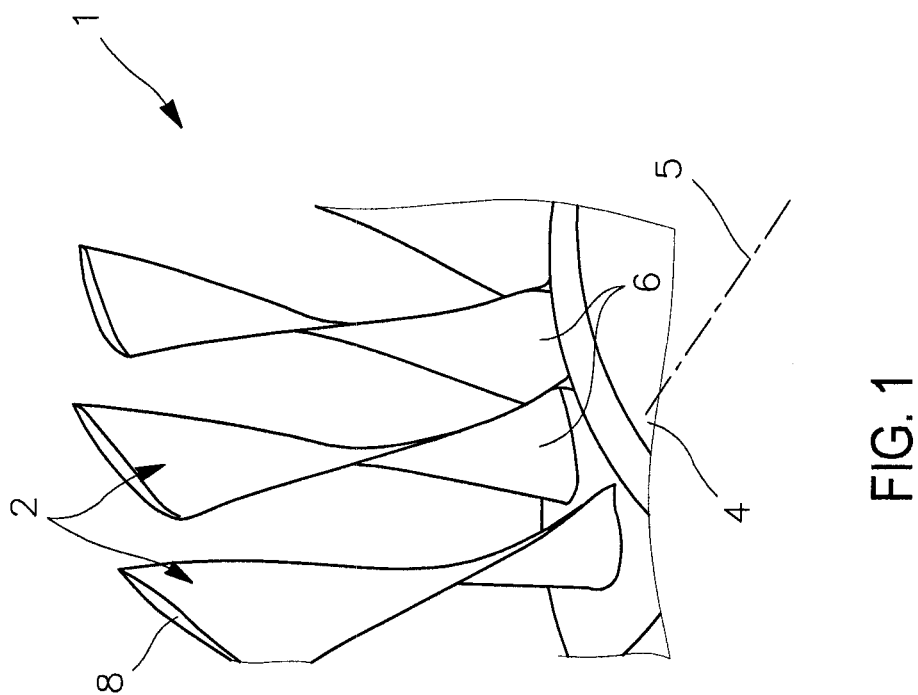
FIG. 1 shows a perspective partial view of a single-piece blisk for a turbine engine that can be obtained by implementing the manufacturing process according to this invention.

Firstly with reference to FIG. 1, the figure shows a single-piece blisk 1 to be obtained by the use of a manufacturing process according to this invention. It is preferably intended to form part of a compressor or turbine rotor for an aircraft turbine engine.

The single-piece blisk, hereinafter referred to as a blisk that is to be obtained using the process according to this invention is large, in other words its diameter is greater than or equal to 800 mm, the length of its blades 2 is not less than 150 mm and the thickness «e» of its disk 4 is greater than or equal to 130 mm. Furthermore, the blades supported by the disk 4 with its central axis 5 are strongly twisted with an angle of twist up to or even more than 45°. For information, this angle is equal to the fictitious angle between the root 6 and the tip 8 of a specific blade 2, according to conventional practice.

A preferred embodiment of the process for manufacturing the blisk 1 will now be described with reference to FIGS. 2a to 2d.

Firstly, a first turning step is performed on a block of material made of titanium alloy, also called a «single-piece blank» and preferably pre-machined, to machine this block for example to within 1 mm of its final dimensions.

The next step consists of cutting the solid block using an abrasive water jet so as to form the blade preforms.

This is done using a very high pressure (for example 3000 bars) and very high precision water jet cutting machine (for example a 6-axis machine). The very high water pressure transports the abrasive optimising its cutting effect on the material. The water jet is created in a known manner using a diamond or sapphire nozzle. There is also a mixing chamber used to add abrasive such as sand. A focussing gun homogenises the water and sand, focussing sand on the zone to be cut.

This abrasive jet cutting technique enables a large material removal rate and good repeatability.

It is thus perfectly suitable for removing material so as to create inter-blade spaces through the entire thickness «e» of the material block along its axis 5.

This is illustrated in FIG. 2a that shows the top part of the material block 100 after the abrasive water jet cutting step is complete. Therefore, this block has blade preforms 102 extending along the radial direction from disk 4, in other words orthogonally to the central axis 5. In general, the cutout is made within the thickness of the block 100 so as to form inter-blade spaces 110 between blade preforms 102 that are directly consecutive along the circumference.

This abrasive water jet cutting step can be implemented by making a first cutting operation to remove a first piece of material that twists or has a spiral shape along the radial direction from the disk, followed by a second cutting operation to remove a second smaller volume of material, that also twists or has a spiral shape along the radial direction.

More precisely the left part of the diagrammatic view contained in FIG. 2b shows that the first cutting operation will cut out a first piece of material 114 extending through the entire thickness of the block 100 along its axis 5. This is done by displacing the axis of the focussing gun 116 along a globally U-shaped line 118 shown in the bottom part of FIG. 2a, initiated from a radial end of the block 100 and extending radially inwards as far as the disk 4, the line 118 then following this disk along the circumferential direction before extending again radially outwards to reach another radial end of the block 100.

During its path along the above-mentioned line 118, the axis of the gun 116 moves by an appropriate additional movement relative to the axis 5 that preferably remains fixed, this additional movement essentially consisting of the axis of the gun pivoting about the radial direction and forming a first piece 114 with a generally twisted shape along the radial direction. More generally, note that the path followed by the gun 116 relative to the axis 5 is a so-called 5-axis path obtained by two simultaneous rotations. The first piece 114 is preferably removed manually by the operator as shown diagrammatically in the central part of FIG. 2b. As can be seen on this figure that shows a typical section perpendicular to the radial direction, the piece 114 is in the form of a quadrilateral for which the two opposite sides along the thickness of the block pass very close to the two directly consecutive blades 2 that will be obtained once the process is complete.

Following on from the above, each removal of a first piece 114 forms the surface of two directly consecutive blade preforms 102. Preferably, the first step is to cut out all the first pieces 114, the number of which depends on the number of blades to be provided in the blisk, and these pieces 114 are then removed manually before starting the second cutting operation.

This second operation is done such that the shape of the resulting blade preforms is as close as possible to the twisted shape with inverted curvature of the final blades which is difficult to approach with a single cut since the abrasive water jet passes through the block in an approximately straight line, although the blade sections are curved.

The right part of the diagrammatic view contained in FIG. 2b shows that the second cutting operation will cut a second piece of material 120 that extends over only part of the thickness of the block 100, in other words over only part of the thickness of the radial elements 122 formed by removal of the first pieces 114. The piece 120 also extends only over a radial portion of its associated radial element 122, namely it extends from the root without reaching the tip as can be seen in FIG. 2a.

This is done by moving the focussing gun 116 along a radial line 124, a portion of which is shown in FIG. 2a. It is initiated from root 4 and therefore extends approximately radially without reaching the ring 112 formed by removal of the first pieces 114. For example, the line 124 through which the abrasive water jet passes is located at about half-thickness of the radial elements 122, and stops at the radial mid-height of these elements.

During its path along the above-mentioned line 124, the axis of the gun 116 is driven by an appropriate additional movement relative to the axis 5 that preferably remains fixed, this additional movement essentially involving pivoting of the axis of the gun about the radial direction, and forming a second piece 120 also with a twisted shape along the radial direction. More generally, note that the path followed by the gun 116 relative to the axis 5 is a so-called 5-axis path obtained by two simultaneous rotations. This second piece 120, once completely separated from the root 5 still by abrasive water jet, preferably separates by itself without assistance by the operator, as shown diagrammatically in the right part of FIG. 2b.

In this respect, note that the gun 116 moves not only along the approximately radial line 124, but also along a circular portion (not shown) of a line extending from the inner radial end of the line 124 along the root 4 to completely separate the piece 120 from the root.

As can be seen in FIG. 2b that shows an arbitrary section perpendicular to the radial direction, the piece 120 is in the form of a triangle of which one of the sides passes as close as possible to the blade 2 that will be obtained from the radial element 122 concerned, once the process is complete.

Once all the second pieces 120 have been removed, all that remains of the block are the blade preforms 102 derived from the disk 4 and separated from each other by the inter-blade gaps 110.

The abrasive water jet cutting step is then completed, after removing at least 50% by weight of the block of material.

The next step is to mill the blade preforms 102 so as to obtain profiled blade blanks 202. In other words, the purpose of this step, for example done using a 5-axis milling machine, is to remove the material remaining on the blade preforms 102 to approach the final dimensions, for example within 0.6 mm.

Figure 2D:
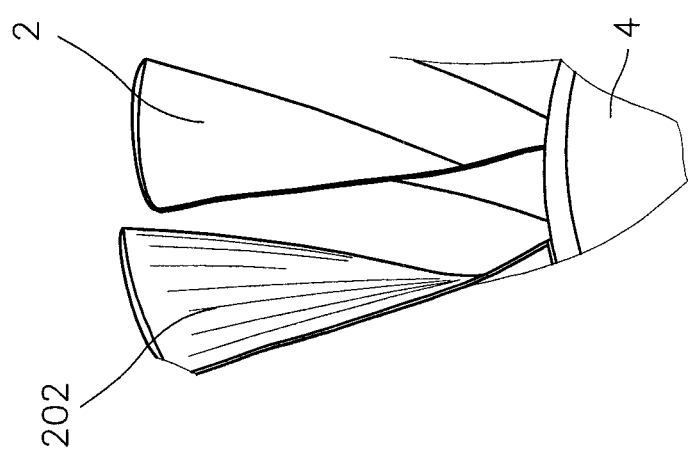
Figure 2C:
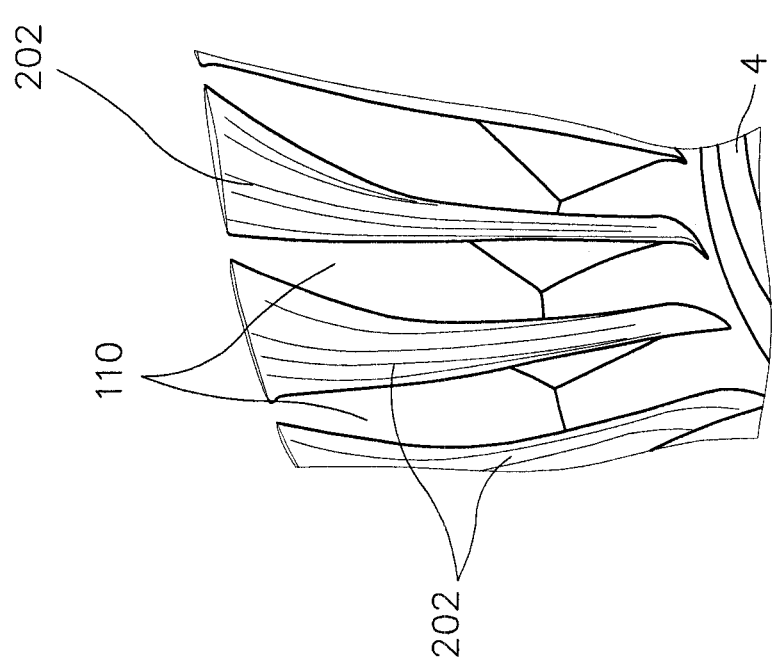

In this case, the preforms 102 are preferably machined one by one and each forms a profiled blade blank 202, as shown in FIG. 2c.

Another milling step is then done and is called the finishing step to mill the blades 2 to achieve their final profile from the blanks 202. The tooling used enables more precise machining to obtain the final dimensions, therefore obtaining blades 2 as shown in the right part of FIG. 2d.

At this stage of the process, the remaining volume of material is less than 25% of the volume of this block just before initiation of the abrasive water jet cutting step, namely just after the above-mentioned turning step.

The process may also be continued by one or several conventional steps including a polishing step for example by manual fitting or tribofinishing, a shot blasting step, a blade cutting to length step and/or a blisk balancing step.

Obviously, an expert in the subject could make various modifications to the invention as described above, solely as non-limitative examples.

The invention claimed is:

1. A process for manufacturing a single-piece blisk, comprising:
    using an abrasive water jet to cut out a first piece of material from a block of material;
    removing the first piece of material from the block of material;
    using the abrasive water jet to cut out a second piece of material from the block of material;
    removing the second piece of material from the block of material so as to create blade preforms extending radially outwards from a disk; and
    milling the blade preforms,
    wherein the first piece of material extends through an entire thickness of the block of material along a central axis of the block of material.

2. The process according to claim 1, wherein the abrasive water jet cutting removes at least 50% by weight of the block of material.

3. The process according to claim 1, wherein the milling the blade preforms is done so as to obtain profiled blade blanks, and is followed by a milling to finish the blade blanks, so as to obtain blades to a final profile.

4. The process according to claim 1, wherein the diameter of the single-piece blisk is greater than or equal to 800 mm.

5. The process according to claim 1, wherein the thickness of the single-piece blisk is greater than or equal to 100 mm.

6. The process according to claim 1, wherein the blades of the single-piece blisk are twisted.

7. The process according to claim 1, wherein the material block used is made of titanium or a titanium alloy.

8. The process according to claim 1, wherein the single-piece blisk is a single-piece blisk for an aircraft turbine engine.

9. The process according to claim 1, wherein the single-piece blisk is a single-piece blisk for a turbine or compressor rotor in an aircraft turbine engine.

10. The process according to claim 1, wherein a water jet cutting machine including a focussing gun is used to cut out the first piece of material and the second piece of material.

11. The process according to claim 10, wherein an axis of the focussing gun is displaced along a globally U-shaped line beginning at a radial end of the block, extending radially inwards, extending along a circumferential direction, and extending radially outwards to another radial end of the block to cut out the first piece of material.

12. The process according to claim 10, wherein the focussing gun moves along a radial line to cut out the second piece of material.

13. The process according to claim 1, wherein the first piece of material is removed manually from the block of material.

14. The process according to claim 1, wherein the first piece of material includes a twisted shape along the radial direction.

15. The process according to claim 1, wherein the second piece of material includes a twisted shape along the radial direction.

16. The process according to claim 1, wherein the second piece of material extends over only a part of the thickness of the block of material.

* * * * *